Feb. 27, 1968   J. L. DAUM ETAL   3,370,596
VEHICLE WASHING APPARATUS
Filed April 28, 1965   6 Sheets-Sheet 1

Fig. 1

INVENTORS
John L. Daum
Ray B. Spurgin
BY *Hastings Ackley
and
Walter J. Jagr*
ATTORNEYS Feb. 27, 1968

J. L. DAUM ETAL 3,370,596

VEHICLE WASHING APPARATUS

Filed April 28, 1965

INVENTORS
John L. Daum
Ray B. Spurgin

BY

ATTORNEYS

Feb. 27, 1968   J. L. DAUM ETAL   3,370,596
VEHICLE WASHING APPARATUS
Filed April 28, 1965   6 Sheets-Sheet 3

INVENTORS
John L. Daum
Ray B. Spurgin
BY
ATTORNEYS

INVENTORS
John L. Daum
Ray B. Spurgin

BY
ATTORNEYS

Feb. 27, 1968  J. L. DAUM ETAL  3,370,596
VEHICLE WASHING APPARATUS
Filed April 28, 1965  6 Sheets-Sheet 5

INVENTORS
John L. Daum
Ray B. Spurgin
BY
ATTORNEYS

Fig. 9

United States Patent Office 3,370,596
Patented Feb. 27, 1968

3,370,596
VEHICLE WASHING APPARATUS
John L. Daum and Ray B. Spurgin, Dallas, Tex., assignors to Delta Manufacturing and Engineering Corporation, Dallas, Tex., a corporation of Texas
Filed Apr. 28, 1965, Ser. No. 451,568
7 Claims. (Cl. 134—45)

This invention relates to washing apparatus and more particularly to an apparatus for washing vehicles.

An object of this invention is to provide a new and improved vehicle washing apparatus for washing a vehicle as it is driven therethrough under its own power.

Another object is to provide a new and improved washing apparatus which washes all surfaces of the vehicle with a hot wash liquid, such as a solution of soap or detergent in water, and then rinses the vehicle with a hot rinse liquid, such as hot water.

Still another object is to provide a vehicle washing apparatus having a first wash arch which directs a spray of hot wash liquid over the vehicle as it is driven therethrough, a wheel washing device which sequentially washes the outer sides of the two front and rear wheels, respectively, of the vehicle, a second wash arch which directs a second spray of hot wash liquid over the vehicle and a rinse arch which directs a spray of hot rinse liquid over the vehicle, A further object is to provide a washing apparatus which also directs a spray of wash liquid at the bottom surfaces of the vehicle to wash therefrom foreign materials, such as salt, mud and the like.

A still further object is to provide a washing apparatus of the type described having control means for automatically and sequentially operating the first and second wash arches, the wheel washing device and the rinse arch as the vehicle is driven through the apparatus.

An important object of the invention is to provide a wheel washing device for simultaneously washing each pair of front and rear wheels of a vehicle for a predetermined period of time.

Still another object is to provide a wheel washing device having a pair of spray means between which the pairs of front and rear wheels of the vehicle may be positioned and means for rotating each pair of wheels while the sprays of wash liquid are directed on the outer sides of the wheels of the spray means.

Still another object is to provide a wheel washing device which includes control means for causing automatic operation of the spraying means and of the wheel rotating means when a pair of wheels of a vehicle are properly positioned on the wheel washing device.

A further object is to provide a wheel washing device wherein one of the spray means is movable toward and away from the other whereby the device may be used to wash wheels of vehicles whose wheels are spaced apart different distances.

Another object is to provide a wheel washing device having a main frame provided with idler and drive rollers on which pairs of wheels of a vehicle may be positioned to be supported thereby and to be rotated by the drive roller, a spraying means fixed to one side of the main frame for washing the outer surface of one of the pair of wheels, a carriage mounted on the main frame and movable by the other of the pair of wheels toward or away from the fixed spraying means, and a spraying means carried by the carriage.

Additional objects and advantages of the invention will be readily apparent from the reading of the following description of a device constructed in accordance with the invention, and reference to the accompanying drawings thereof, wherein:

FIGURE 8 is a schematic illustration of a dual pump for pumping water and a washing agent such as soap or detergent;

FIGURE 9–A is a continuation of FIGURE 9 and shows the other portion of the electric control circuit;

Figure 1:
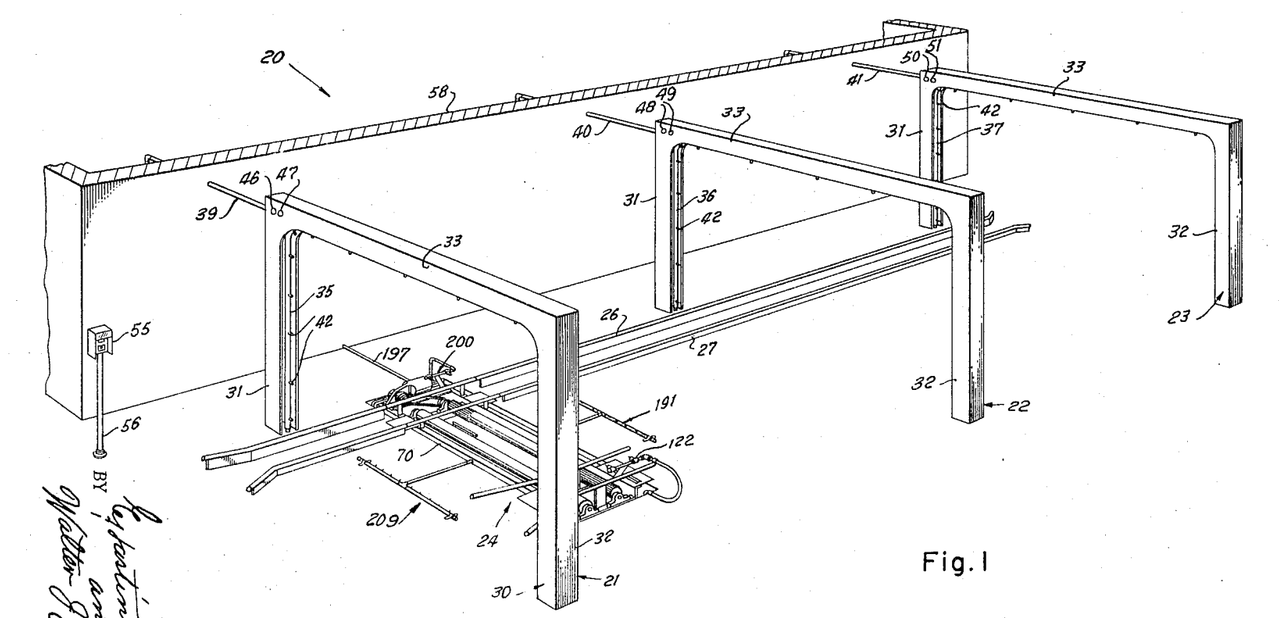
FIGURE 1 is a perspective schematic view of a wash apparatus embodying the invention.
Figure 2:
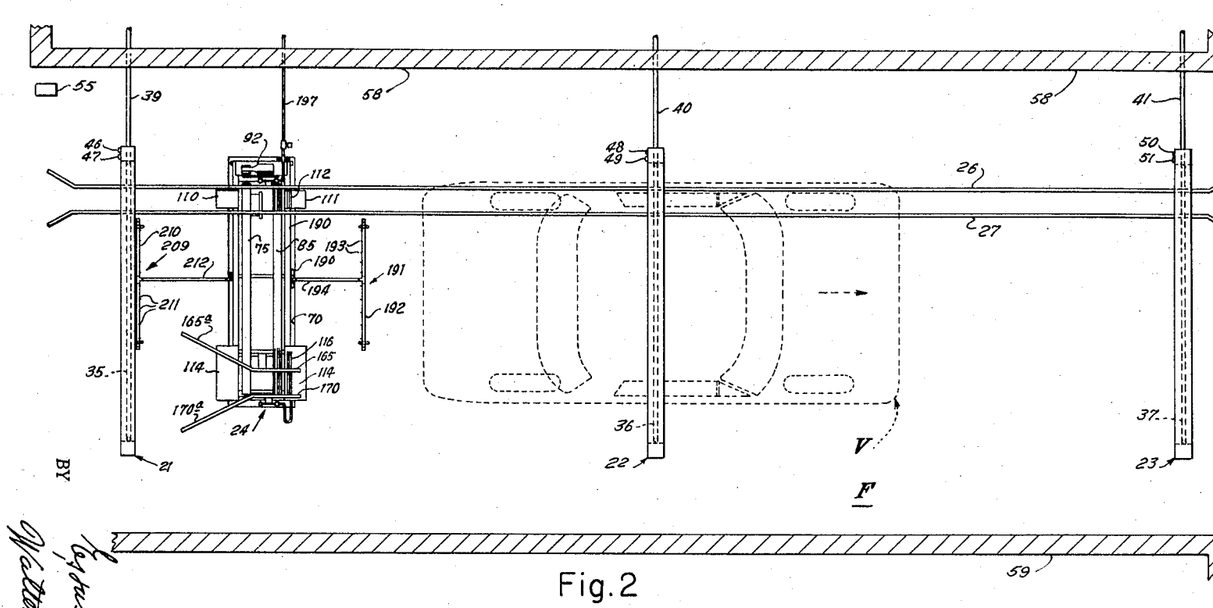
FIGURE 2 is a schematic top view of the wash apparatus.

Referring now to the drawings, the vehicle washing apparatus 20 includes three wash arches 21, 22, and 23, a wheel washing device 24 and a pair of parallel guide rails 26 and 27 which extend through the arches and past the wheel washing device between which the wheels on the left side of the vehicle travel to insure that the vehicle travels in a proper path through the washing apparatus. Each of the three wash arches includes a substantially U-shaped support frame 30 having vertical spaced channel shaped leg portions 31 and 32 and a horizontal channel shaped portion 33. U-shaped nozzle conduits 35, 36 and 37 disposed in and secured to the arches 21, 22 and 23, respectively, and liquid under pressure is conducted to the nozzle conduits 35, 36 and 37 through the conduits 39, 40 and 41, respectively. Each of the nozzle conduits is provided with a plurality of spaced nozzles 42 through which liquid is sprayed on both sides and the top of the vehicle. The areas of spray of the nozzles overlap to insure that all top, front, rear and side surfaces of the vehicle are subjected to the spray during the travel of the vehicle through each spray arch.

The spray arch 21 has red and green signal lamps 46 and 47 mounted in its rear side, the arch 22 has red and green signal lamps 48 and 49 on its rear side and the arch 23 has the green and red signal lamps 50 and 51 at its rear side. The green and red lamps give visual signals to the driver of a vehicle being washed to stop or proceed through the apparatus during the different stages of the washing cycle of the apparatus.

A coin operated switch 55 is mounted in any suitable manner, as on a post 56, an appropriate distance in front of the spray arch 21 so that the driver of the vehicle may initiate operation of the apparatus by inserting an appropriate coin in the switch 55. The washing apparatus is preferably disposed between a pair of vertical side walls 58 and 59.

Figures 3, 4:
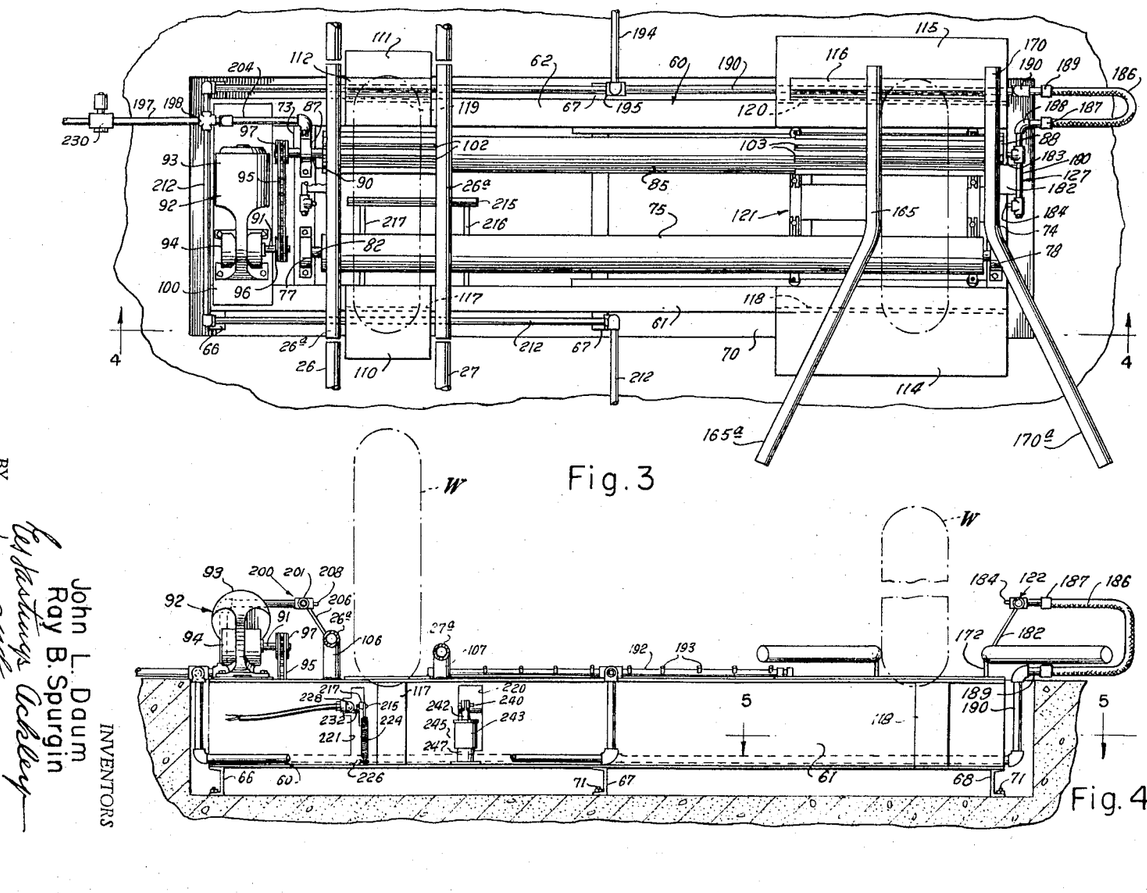
FIGURE 3 is an enlarged top view of the wheel washing device of the apparatus.
FIGURE 4 is a sectional view taken on line 4—4 of FIGURE 3.

The wheel washing device 24, which is disposed between the front and middle spray arches 21 and 22, includes a main frame 60 having parallel rear and front side channel members 61 and 62 extending transversely of the path of travel of the vehicle through the apparatus. The bottom flanges 63 and 64 of the side channel members rest upon and are rigidly secured, as by welding, to three transverse channel shaped bottom members 66, 67 and 68. The base frame is disposed in a transversely extending upwardly opening pit or recess 70 in the concrete floor F and is secured thereto by bolts 71 whose lower ends are embedded in the floor and whose upper threaded end portions extend through suitable apertures in the bottom flanges of the support members. The main frame also includes a pair of bearing support channel members 73 and 74 which extend longitudinally between the side channel members adjacent opposite ends thereof and are rigidly secured thereto in any suitable manner, as by welding. A rear idler roller 75 is rotatably supported on the support frame members 73 and 74 by means of pillow blocks 77 and 78 rigidly secured to the support frame mmebers, as by bolts 79, in which are rotatably journaled opposite end portions of the shaft 82 of the idler roller.

A drive roller 85 is similarly rotatably supported on the frame members forwardly of the rear idler roller by means of pillow blocks 87 and 88 rigidly secured to the frame members by bolts 89. The shaft 90 of the drive roller is rotatably journaled in the pillow blocks 87 and 88. One end portion of the shaft 90 extends through the pillow block 87. The drive roller shaft is connected to the output shaft 91 of a drive unit 92, which includes an electric motor 93 and a speed reducing device 94, by a chain 95 which extends about the sprockets 96 and 97 rigidly secured to the shafts 91 and 90, respectively. The motor and speed reducer assembly are rigidly secured as by bolts and the like to a mount plate 100 rigidly secured, as by welding, to the rear and front side frame members 61 and 62.

The drive roller 85 has radially outwardly extending ribs 102 and 103 along its opposite end portions to provide a greater frictional engagement between the drive roller and the wheels W of a vehicle V when such wheels are supported by the idler and drive rollers.

The pair of tubular guide members 26a and 27a are rigidly secured to the side frame members 61 and 62 by means of posts 106 and 107, respectively. The tubular guide members constitute sections of the guide rails spanning the pit 70. A rear plate 110 is welded to the rear frame member 61 and bridges the gap between the top surface of the rear frame member 61 and the floor F between the guide rails.

A front plate 111 secured to the top of the front frame member 62 similarly bridges the gap between the front frame member and the floor between the guide rail. The front plate 111 has an angular member or bumper 112 rigidly secured thereto by welding. A similar rear plate 114 bridges the gap between the floor and top frame member 61 at the other end of the pit while a plate 115 mounted to the front side frame member 62 bridges the gap between the floor and the forward frame member. The front plate 115 also has an angular bumper 116 mounted thereto and disposed in alignment with the bumper 112. The bumpers 112 and 116 which are engageable by each pair of left and right wheels, respectively, of the vehicle are provided to give the driver of the vehicle with an indication that the wheels of his vehicle have moved forwardly out of operative engagement with and support by the idler and drive rollers.

Vertical brace plates 117 and 118 are provided between the spaced longitudinal flanges of the rear side frame member below the plates 110 and 114 over which the wheels of the vehicle are movable. Similar vertical plates 119 and 120 extend between the spaced longitudinal flanges of the front side frame members 62.

Figure 5:
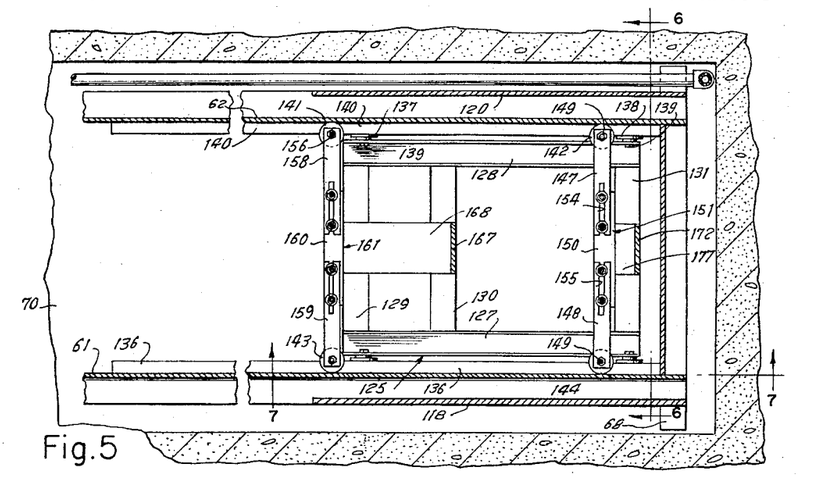
FIGURE 5 is a sectional view taken on line 5—5 of FIGURE 4.

A carriage 121, which carries a nozzle assembly 122 for directing a spray of liquid on the outer side surfaces of the right wheels of the vehicle, is mounted on the main frame 60 for transverse movement across the path of movement of a vehicle in order to position the nozzle assembly at a proper distance relative to each wheel on the right side of the vehicle when it is supported on the idler and drive rollers. The carriage includes a rectangular frame 125 having rear and front channel members 127 and 128 rigidly secured to one another by the channel members 129, 130 and 131 which the rear and front channel members abut and to which they are secured by bolts 132.

Figures 6, 7:
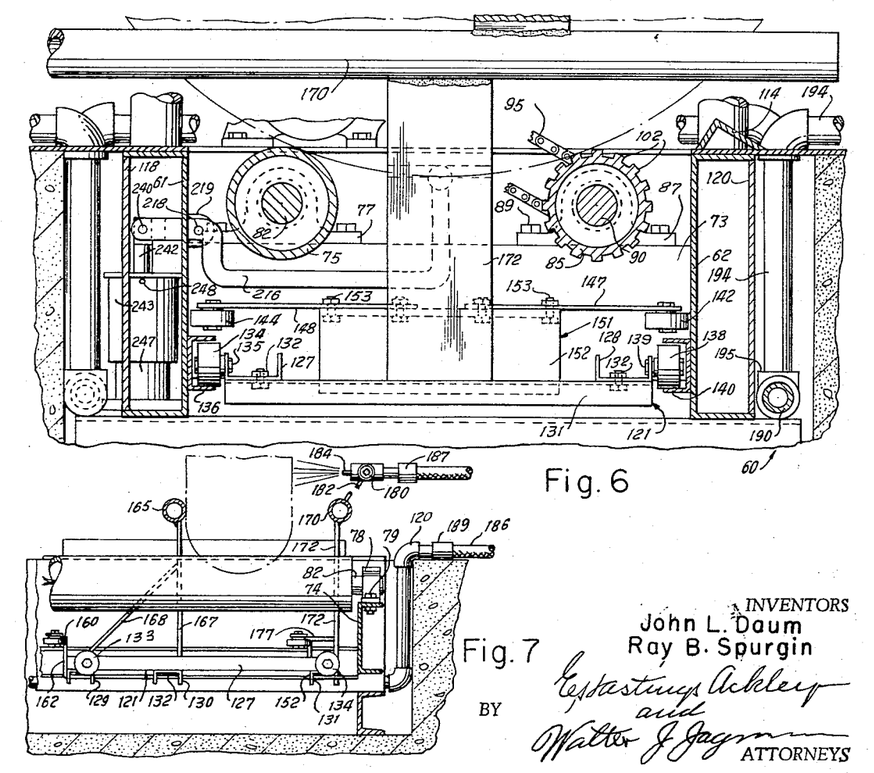
FIGURE 6 is a sectional view taken on line 6—6 of FIGURE 5.
FIGURE 7 is a sectional view taken on line 7—7 of FIGURE 5.

The rear frame member 127 has a pair of rollers 133 and 134 mounted thereon for rotation about horizontal axes, as by means of bolts or shafts 135. The rollers are received in an inwardly opening channel shaped track 136, rigidly secured as by welding to the rear main frame member 61. The front frame member 128 has a similar pair of rollers 137 and 138 rotatably mounted thereon by bolts or shafts 139 for rotation about horizontal axes and received in an inwardly opening channel shaped track 140 rigidly secured to the main front member 62. The rollers 133 and 134 and the rollers 137 and 138 are supported by and roll on the bottom horizontal flanges of the tracks 136 and 140.

The carriage is held against forward movement relative to the main frame by rollers 141 and 142 which engage the web of the front main frame member 62 and against rearward movement relative thereto by the rollers 143 and 144 which engage the web of the rear main frame member 61.

The rollers 142 and 144 are mounted for rotation about vertical axes on the outer ends of horizontal bars 147 and 148, as by bolts 149. The bars 147 and 148 are rigidly secured to the horizontal flange 150 of an angular bracket 151, whose vertical leg 152 is rigidly secured to the member 131 as by welding, by means of bolts 153 which extend upwardly through suitable apertures in the horizontal flange and elongate slots 154 and 155 of the bars 147 and 148, respectively. The inner rollers 141 and 143 similarly are rotatably mounted, as by bolts 156, to the outer ends of flat bars 158 and 159 whose inner end portions rest upon and are rigidly secured to the horizontal flange 160 of an angular bracket 161 whose vertical flange 162 is rigidly secured to the frame member 129.

It will be apparent that the position of the front rollers 141 and 142 and rear rollers 143 and 144 may be adjusted by adjusting the position of the bars on which they are mounted relative to the brackets 151 and 161.

An inner horizontal guide rail 165 located above the idler and drive rollers is mounted on the carriage by means of vertical planar post 167 whose lower end is rigidly secured as by welding to the inner brace member 130 of the carriage and which extends upwardly between the idler and drive rollers. A brace 168 which extends from the inner frame member 129 to the post 167 is rigidly secured thereto by welding. An outer horizontal guide rail 170 is mounted on the carriage by means of a vertical planar post 172 whose lower end is welded to the carriage frame member 130 and which also extends upwardly between the idler and drive rollers. A brace plate 177 connects the bracket 151 with the post.

The nozzle assembly 122 includes a conduit or pipe 180 rigidly secured to the upper end of a planar bracket 182 whose lower end is rigidly secured as by welding to the outer guide rail 170. The guide rails 165 and 170 of the carriage have rearwardly divergent end portions 165a and 170a which are engageable by the wheel at the right side of a vehicle to move the carriage to the left or the right if the carriage is not properly aligned with the right wheels of a vehicle whose left wheels are between the guide rails 26 and 27. A pair of nozzles 183 and 184 are mounted on the pipe 180 through which liquid under pressure from the pipe 180 is directed at the outer sides of a wheel when the wheel is supported by the idler and drive rollers. The liquid under pressure is supplied to the pipe 180 through a flexible conduit 186 which has one end connected to one end of the pipe 180 by a suitable fitting 187 and elbow 188 and whose other end is similarly secured by a fitting 189 to a pipe 190 which has a horizontal portion resting on and secured to, in any suitable manner, the forward end portions of the main base support members 66, 67 and 68.

A front nozzle assembly 191 includes a pipe 192 mounted on the floor F forwardly of the pit 70 having a plurality of nozzles 193 for directing a spray of liquid at the front end of a vehicle when its front wheels are resting on and are supported by the idler and drive rollers. The front nozzle pipe is provided with liquid under pressure from the conduit 190 through a conduit 194 which is connected to the conduit 190 by a T-coupling 195. The pipe 190 is connected to a liquid supply pipe 197 by a four way coupling 198. The spray from the nozzles of the pipe 192 is directed at the rear portion of the bottom surface of the vehicle when the back wheels of the vehicle are supported by the idler and drive rollers.

A nozzle assembly 200 for washing the left wheels of the vehicle includes a conduit or pipe 201 to which water from the inlet pipe 197 is delivered through a pipe 204 which is also connected to the coupling 198. The pipe is rigidly mounted on the guide rail 26a by a bracket 206 and has a pair of nozzles 208 which deliver a spray to the outer side of the left wheel of a vehicle when it is supported by the idler and drive rollers.

A rear nozzle assembly 209 includes a pipe 210 mounted on the floor rearwardly of the pit 70 and having a plurality of nozzles 211 which direct a spray of liquid upwardly and forwardly at the front portion of the bottom surface of the vehicle when its front wheels are supported on the idler and drive roller and at the rear surfaces of the vehicle when the rear wheels are supported by these rollers. Liquid under pressure is delivered to the nozzle pipe 210 through a conduit 212, sections of which extend through the pit, which is also connected to the common pipe coupling 198.

It will be apparent that whenever the supply pipe 197 is connected to a source of liquid under pressure, sprays of the liquid will be ejected through the nozzles of the pipes 180, 192, 201 and 210.

A feeler bar 215 is pivotally secured to the rear main frame member 61 by arms 216 and 217 pivotally secured intermediate their ends by pivot pins 218 to the brackets 219 rigidly secured, as by welding, to the web of the frame member. The rear end portions of the arms 216 and 217 extend rearwardly of the web of the main rear frame member through the slots 220 and 221 therein. The feeler bar is biased upwardly between the idler and drive rollers by a tension spring 224 whose upper hook end portion is secured to the rear end of the arm 217, as by a pin or bolt 225 and whose lower hook end portion engages a bracket 226 rigidly secured as by welding to the bottom horizontal flange of the main frame member 61.

A mercury switch 228 which controls the operation of the motor 93 and of a valve 230 which controls flow of liquid through the supply pipe 197 is mounted on the arm 217 by a bracket 232 and closes to open the valve 230 and connect the motor 93 to a source of electric current when the feeler bar is depressed by the movement of a wheel onto the idler and drive rollers 75 and 85.

The bifurcated rear end of the other arm 216 is pivotally connected by a pivot pin 240 which extends through suitable apertures of the arm 216 and the upper end portion of a rod 242 of the upper telescoping cylinder 243 of a dash pot assembly 245. The upper cylinder 243 telescopes over a cylinder 247 rigidly mounted as by welding on the lower horizontal flange of the main frame member 61. The dash pot assembly functions in the usual well known manner to slow down the upward movement of the feeler bar when the wheel moves forwardly off the idler and driver rollers and thus permits the pivot bar to be moved upwardly by the spring 224. Entry of air into the dash pot formed by the two cylinders 243 and 247 whose top and bottom ends are closed is very slow due to the close fit of the upper cylinder 243 on the cylinder 247. A very small orifice 248 in the upper cylinder may be provided to permit flow of air into and out of the chamber formed by the two cylinders.

Figure 9:
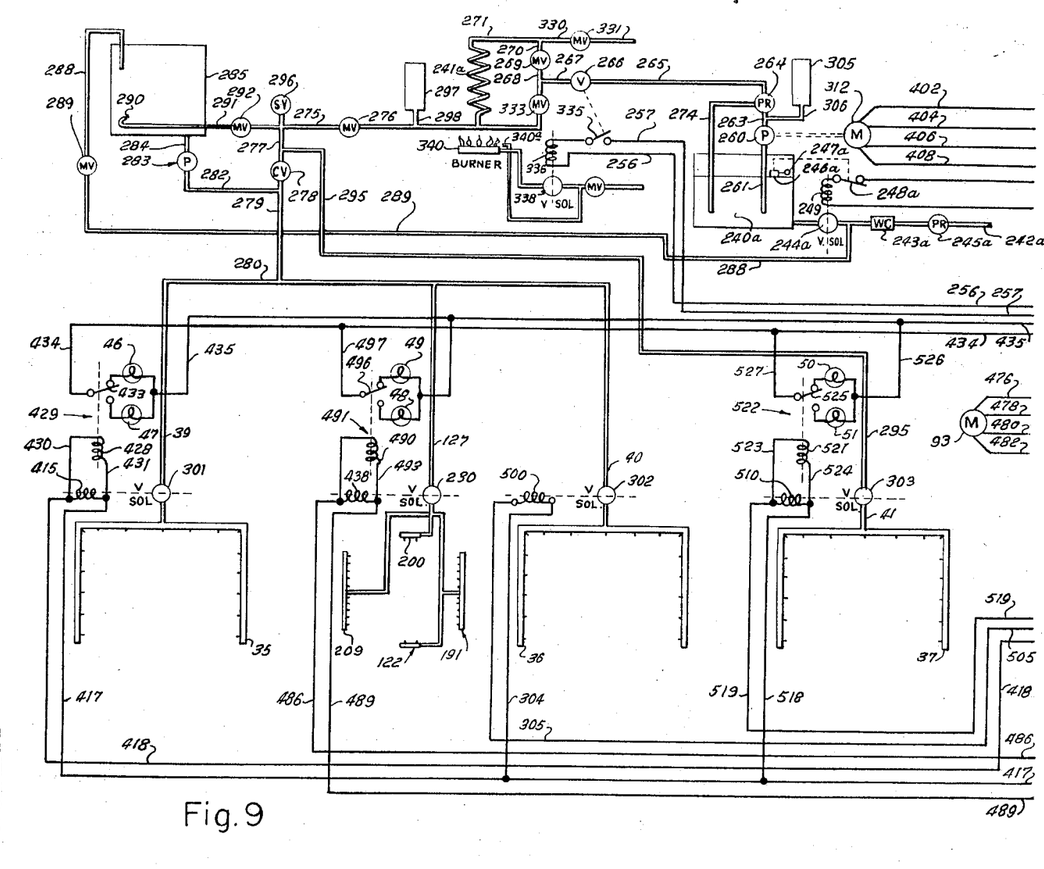
FIGURE 9 is a schematic illustration of the washing apparatus and of a portion of the electric control circuit therefor.

Water under pressure is supplied to the pipes 39, 40 and 41, which are connected to the nozzle conduits or pipes 35, 36 and 37, and to the nozzle assemblies 122, 191, 200 and 209 from a tank or reservoir 240a through a heating coil 241a in which the water is heated to a predetermined temperature. Water is introduced into the tank through an inlet pipe 242a which may be connected to any suitable source of water under pressure, such as the water supply system of a city, through a suitable water conditioner 243a, a float control solenoid valve 244a and a pressure regulator valve 245a. When the water level in the tank drops to a predetermined level a float 246a, pivotally secured to the tank 240a, as at 247a, closes a switch 248a which connects the solenoid winding 249 of the valve 244 across the main conductors 251 and 252 of a four conductor, three phase alternating current input circuit which also includes the main conductors 253 and 254. The conductor 251 is the common conductor of the input circuit. Water from the tank is pumped to the heating coil 241a by a pump 260 whose inlet is connected to a pipe 261 which extends into the tank and is open at its lower end and whose outlet is connected by a pipe 263, a pressure regulated bypass valve 264, a pipe 265, a control valve 266, pipes 267 and 268, a manually operated valve 269 and the pipes 270 and 271 to the inlet of the heating coil. The pressure regulator valve 264 when the pressure in the pipe 265 exceeds a predetermined value stops flow from the pipe 263 to the pipe 265 and permits flow of the water from the pipe 263 to the pipe 274 and thus back to the tank. The pressure regulated bypass valve 264 permits the pump to operate and prevents excessive pressures within the pipe 265 when no flow of water may take place through the pipe 265, as will be explained.

The outlet end of the heating coil 241a is connected to the pipes 197, 39 and 40 through a pipe 275 which has a manually operated valve 276 connected therein, a pipe 277, a check valve 278 which prevents reverse flow through the pipe 277, the wash liquid pipe 278 and a manifold pipe 279 to which the pipes 197, 39 and 40 are connected.

An active or wash agent, such as a detergent or soap, is introduced into the pipe 279 downstream of the check valve 278 for mixing with the water flowing therethrough to the manifold pipe, through a pipe 282, which is connected to the pipe 279 and to the outlet of a pump 283, and a pipe 284 which connects the inlet of the pump to the bottom of a tank 285 in which the active agent is stored. Water is introducible into the tank 285 through a pipe 288 which is preferably connected to the pipe 242a downstream of the water conditioner and upstream of the solenoid control valve 244a. The pipe 288 has a manual valve 289 connected therein.

The solution or mixture of the wash agent and water in the tank 285 may be agitated by introducing hot water into the tank 285 through a nozzle 290 located in the tank adjacent its bottom and connected by the pipe 291 to the hot water pipe 275. The pipe 291 has a manual valve 292 connected therein.

Hot water without any wash agent therein is supplied to the pipe 41 of the nozzle pipe 37 through a pipe 295 which is connected to the pipe 277 upstream of the check valve 278. It will be apparent that the check valve 278 prevents any flow of the wash agent into the pipe 295.

A safety valve 296 is provided which, when the pressure in the pipe 275 exceeds a predetermined value, opens to decrease such pressure. An air chamber or dome 297 whose lower end opens through the pipe 298 to the pipe 275 downstream of the outlet of the heating coil 241a is provided to prevent excessive pressure surges from being developed in the pipe 275 and transmitted to the heating coil when the manual valve 276 or any one of the solenoid valves 230, 301, 302 or 303 closes. A similar gas air chamber or dome 305 has its lower end connected by the pipe 306 to the pipe 263 between the outlet of the pump 260 and the pressure regulated bypass valve 264 to similarly prevent excessive back press surges from being applied to the pump 260 due to the closing of any of the valves downstream of the outlet of the main pump. The gas under pressure in the dome 305 also causes the water to flow to the heating coil under a substantially uniform pressure and at a substantially constant rate even though the pump 260 is of the reciprocating type.

Figures 8, 9A:
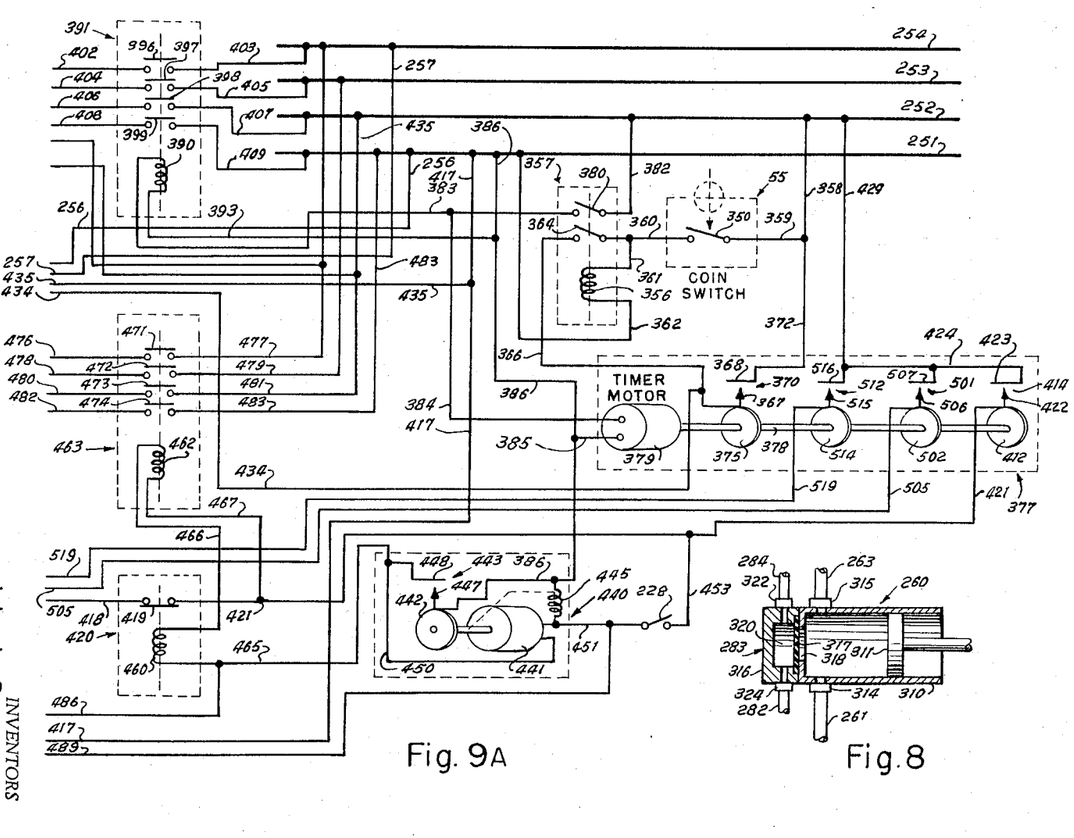

The pump 283 may be of any suitable type, for example, of the type illustrated in FIGURE 8 which is operated by the varying pressure developed within the cylinder 310 of the water pump 260 as its piston 311 is reciprocated by the electric motor 312 to which it is mechanically connected in a suitable manner. The pump 260 includes a check valve 314 which permits flow from the pipe 261 into the cylinder but prevents its flow therefrom into the pipe 261 and a similar check valve 315 which permits flow of water from the cylinder to the pipe 263 but prevents flow from the pipe 263 into the cylinder. The pump 283 may include a housing 316 which is rigidly secured to the cylinder 310 in any suitable manner and a resilient diaphragm 317 which is exposed to the pressure within the main pump cylinder 310 through an aperture or orifice 318, and which defines one side of the chamber 320 of the pump 283. The pump 283 also includes a check valve 322 which permits flow of liquid from the pipe 284 into the chamber 320 but prevents flow from the chamber to the pipe 284 and a similar check valve 324 which permits flow of fluid from the chamber 320 to the pipe 282 but which prevents reverse flow from the pipe 282 into the chamber 320.

It will be apparent that the pump 283 will be automatically placed in operation whenever the main pump is operating and will pump the solution from the tank 283 into the pipe 279 for mixture with the hot water flowing therethrough whenever any one of the solenoid valves 301, 230, 302 and 303 is open. If all of these valves are closed, the diaphragm 317 will be maintained in a static condition.

In order to permit reverse circulation through and flushing of the heating coil 241a, a pipe 330 having a manual valve 331 is connected to the pipe 271 and the pipe 268 is connected to the pipe 275 through a manual valve 333. It will be apparent that whenever it is desired to flush out the heating coil to remove any scale or the like deposited on its internal surfaces, the manual valves 276 and 269 are closed while the valves 333 and 331 are opened whereupon operation of the pump 260 causes the water to flow in a reverse direction through the heating coil and to a disposal or discharge location through the pipe 330.

The valve 266 which is responsive to the rate of flow of water through the pipe 267, and thus through the heating coil, opens the switch 335 to de-energize the winding 336 of a solenoid operated valve 338 which controls flow of gas to a suitable burner 340 which heats the water as it flows through the heating coil 241. The valve 338 controls flow of gas through the pipe 341 which is connected to a suitable source of fuel gas under pressure through the manually operated valve 342. The solenoid winding 336 is connected across the common conductors 251 and 254 whenever the switch 335 is in the closed position by the conductors 256 and 257.

The electric control circuit for automatically controlling operation of the washing apparatus includes the coin switch 55 of any suitable type which has a switch 350 which is closed for a predetermined short period of time by a coin when it is inserted into the coin switch. The switch 350, when closed, connects the winding 356 of a relay 357 across the main conductors 251 and 252 through the conductors 358, 359, 360, 361 and 362. When the relay winding 356 is energized, it moves its holding contact 364 to its closed position which then connects the relay winding again across the main conductors 251 and 252 through the conductors 362, 361, 360 and 366, the movable and stationary contacts 367 and 368 of a switch 370, when these are in their closed position, and the conductor 372. If the movable contact 367 is in its closed position, the relay winding 356 will remain energized even though the coin switch opens as the coin deposited in the coin switch drops out of engagement with the contact 350 and into a suitable receptacle thereof and the switch 350 opens.

The switch 370, which is in its open position at the time the coin is inserted into the coin switch, is moved to its closed position during the short period of time the movable contact 350 is in its closed position by the cam 375 of the main timer 377 secured to a drive shaft 378 of a synchronous motor 379 which is connected across the main conductors 252 and 251 by a second relay contact 380 of the relay 357 when the relay winding 356 is energized. The relay contact 380 connects the timer motor across the conductors 251 and 252 through the conductors 382, 383, 384, 385 and 386. The cam 375 as it is rotated will then hold the switch 370 closed for a predetermined period of time, for example, two minutes, and will then permit the switch 370 to open to de-energize the relay winding 356. During this two minute period the full cycle of operation of the wash apparatus takes place.

The relay contact 380, as soon as the relay winding 356 is energized, connects the contactor winding 390 of the contactor 391 of the pump motor 312 across the main conductors 251 and 252 through the conductors 382, 383, 393 and 386. The pump motor will thus immediately start operation and the main pump 260 will cause water to be drawn into the pipe 261 and pumped into the pipe 263. Then the contactor winding 390 is energized, its contacts 396, 397, 398 and 399 are moved to their closed positions to connect the three phase alternating current motor 312, which may be the induction type, across the main conductors 251, 252, 253 and 254. When the contactor winding 390 is energized, its contact 396 connects one terminal of the motor to the conductor 254 through the conductors 402 and 403, its contact 397 connects second terminal of the motor to the conductor 253 through the conductors 404 and 405, its contact 398 connects the third terminal of the motor to the conductor 252 through the conductors 406 and 407, and its contact 399 connects a fourth common terminal of the motor to the common main conductor 251 of the input circuit through the conductors 408 and 409.

The main timer has a cam 412 on its shaft which closes a switch 414 of the timer to connect the solenoid winding 415 of the solenoid valve 301 across the main conductors 251 and 253 through the conductors 417 and 418, the normally closed contact 419 of a relay 420, the conductor 421, the movable and stationary contacts 422 and 423 of the switch 414, and the conductor 424. The switch 414 is thus closed immediately upon the initiation of operation of the main timer motor and of the pump 260 so that a solution of hot water and a wash agent, such as soap or detergent, flows through the open valve 301 and is directed as a spray on the vehicle as it is driven through the first arch 21.

The winding 428 of a relay 429 is connected across the solenoid valve winding 415 by means of the conductors 430 and 431. When relay winding 428 is not energized, its contact 433 is in its upper position connecting the red signal lamp 46 on the first arch across the conductors 251 and 252 by means of the conductors 434, the switch 370 and the conductors 417 and 435. When the relay winding 428 is energized, it moves its contact 433 downwardly to cause the green signal lamp 47 to be similarly connected across the conductors 251 and 252 and at the same time de-energizing the red signal lamp 46.

The solenoid winding 415 is de-energized to close the valve 301 and the solenoid winding 438 of the solenoid valve 230 is energized to open the valve 230 after the valve 301 has been open for a predetermined period of time, for example 45 seconds, whenever the mercury switch 228 is closed to cause the wash liquid to be supplied to the nozzle assemblies 122, 191, 200 and 209 for a predetermined period of time by a resettable timer device 440 which may be of the type commercially available as the "Model 10336 Synchronous Motor Reset Timer" from Cutler Hammer. The timer device 440 includes a synchronous motor 441 which drives a cam 442 which closes a switch 443 thereof and a reset solenoid 445 whose armature (not shown) at the time of its energization moves the cam 442 to position wherein it holds the movable contact 447 of the switch in engagement with its stationary contact 448. The switch 443 in its closed position connects the synchronous motor 441 across the conductors 251 and 253 through the conductors 386, the conductors 450 and 451, the closed mercury switch 228, the conductors 453 and 421, the switch 414 and the conductor 424. The solenoid winding 445 is connected across the main conductors 251 and 252 through the conductor 386, the conductors 451, 453 and 421, the switch 414 if it is closed, and the conductor 424 immediately upon the closing of the mercury switch 228. The timer motor 441 remains energized until the cam 442 is rotated for a predetermined period of time, for example, 15 seconds, at which time the cam causes the switch 443 to open even though the mercury switch 288 is still closed since the solenoid 445 must be de-energized, as by opening the switch 228, then be energized to again move the cam 442 to the position wherein it initially closes the switch 443. The switch 448 when it is closed energizes the winding 460 of the relay 420 to move its contact 419 to open position and thus de-energize the solenoid winding 415 of the valve 301. The switch 443 of the timer device 440 when in its closed position connects the winding 460 of the relay 320 and the winding 462 of the contactor 463 in series across the main conductors 251 and 252 through the conductors 386, 448, 465, 466 and 427, the switch 414 and the conductor 424. The relay winding 460 when energized moves its contact 419 to open position thus de-energizing the solenoid winding 415 and causing the solenoid valve 301 to close.

The contactor 463 when its winding 462 is energized moves its contacts 471, 472, 473 and 474 to their closed positions to connect the three phase alternating current motor 93 across the main conductors 251, 252, 253 and 254. The contact 471 connects one terminal of the motor to the main conductor 454 by the conductors 476 and 477, the contact 472 connects the second terminal of the motor to the main conductor 453 by the conductors 478 and 479, the contactor 473 connects the third terminal of the motor to the main conductor 452 by the conductors 480, 481 and 435, and the conductor 474 connects the common terminal of the motor to the common main conductor 251 by the conductors 482 and 483.

The switch 443 also connects the solenoid winding 418 of the solenoid valve 239 across the input conductors when the mercury switch 228 and the switch 414 are closed through the conductors 386, 465, 486 and 489, the mercury switch 228, the conductors 453 and 421, the switch 414 and the conductor 424.

The winding 490 of a relay 491 is connected across the relay solenoid winding 485 by the conductors 492 and 493 so that the relay winding is energized each time the solenoid valve winding 485 is energized and moves its movable contact 495 to its lower position wherein it connects the red lamp 48 across the conductors 451 and 452 through the conductors 497, 434 and 417. The contact 495 of the relay 491 is normally in its upper position wherein it similarly connects the green lamp 49 across the conductors 251 and 252.

It will thus be apparent that when the switch 414 is closed, the valve 301 will immediately open and remain open until the mercury switch 228 is closed. Closing of the switch 228 will cause the solenoid 445 to move the cam 442 and close the switch 443. Closing of the switch 443 will cause the motor 441 to be energized, solenoid valve 301 to close and the solenoid valve 230 to open for a predetermined period of time, for example, 15 seconds, at which time the switch 443 will again open, the solenoid valve 301 will open and the solenoid valve 230 will close.

The solenoid valve 302 which controls flow of the wash liquid to the nozzle pipe 36 opens when its solenoid winding 500 is connected across the conductors 251 and 252 by a switch 501 which is closed by a cam 502 of the main timer 377, a predetermined period of time after the initiation of operation of the washing cycle, for example, 45 seconds, and at the time the switch 414 opens, and is held closed by the cam 502 for another predetermined period of time, for example, 45 seconds. The switch 501 connects the solenoid winding 500 across the conductors 251 and 252 through the conductors 417, 504 and 505, the movable and stationary contacts 506 and 507 of the switch 501, and the conductor 424.

The solenoid winding 510 of the solenoid valve 303 is energized to open the valve by a switch 512 of the main timer which is moved to its closed position a predetermined period of time, for example, 90 seconds after initiation of the apparatus and at the time that the switch 501 opens, and is held open for a predetermined period of time, for example, 30 seconds. The switch 512 is closed by a rotatable cam 514 of the main timer 377 which moves its movable contact 515 into engagement with its stationary contact 516 to connect the solenoid winding 500 across the main conductors 251 and 252 through the conductors 417, 518, 519 and 424.

The winding 521 of a relay 522 is connected across the solenoid winding 510 by the conductors 523 and 524 and when energized, moves its movable contact 525 to its lower position to connect the green lamp 51 of the third arch across the main conductors 251 and 252.

The cams of the main timer 377 and the timer device 440 have been shown as disks for clarity of illustration.

In use, a supply of a wash or active agent, such as a detergent or soap, is placed in the tank 285 and water is introduced into the tank by opening the manually operable valve 289 to form an aqueous solution of the active agent. The manually operable valve 342 is opened to connect the fuel conduit 341 to a source of fuel gas under pressure and the pilot jet 340a is ignited. The manual valves 276 and and 269 are opened and the valves 333 and 331 are closed to cause water pumped by the pump 260 to flow through the heating coil 241 to the pipe 275. If the water in the tank 240 is now not up to the predetermined desired level, the float 246 causes closure of the switch 248 and water is introduced into the tank through the conduit 242. When the water in the tank 240 reaches a desired level, the float 246 opens the switch 248 and thus de-energizing the solenoid winding 249 and closing the valve 244.

The driver of a vehicle V which is to be washed deposits an appropriate coin in the coin operated switch 55. Such coin in passing through the coin switch closes the coin switch 350 for a predetermined short interval of time. As soon as the coin switch is closed, the relay winding 356 is energized and moves its contacts 364 and 380 to their closed positions. As soon as the contact 380 closes, it connects the timer motor 379 across the conductors 251 and 252 and the rotation of the shaft 378 now causes the cam 375 to close the switch 370 before the coin switch 350 opens. The holding contact 364 now connects the relay winding 356 across the conductors 251 and 252 through the switch 370 and the relay winding will now remain energized until the switch 370 is again opened by the cam 375. The timer motor 379 will therefore remain connected across the conductors 251 and 252 until the switch 370 opens and de-energizes the relay winding 356. When the contact 380 is moved to closed position it connects the winding 390 of the contactor 391 across the main conductors 251 and 252 and the contactor connects the motor 312 of the pump 260 across the main conductors 251–254. The operation of the pump 260 will now cause water to be pumped from the main tank 240a through the heating coil 241a to the nozzles 42 of the conduit 35 of the first spray arch because the rotation of the shaft 378 of the motor 379 now causes the cam 412 to close the switch 414 and thus causes the solenoid valve 301 to be open. As the rate of flow of the water through the valve 266 attains a predetermined value, the solenoid valve 338 will open and the burner 340 which will light and heat the water flowing through the heating coil 241. The operation of the main pump will now also cause operation of the pump 283 which will introduce the aqueous solution of the wash agent into the hot water flowing in the pipe 279 to the nozzle pipe 35. At the time the switch 414 closed the relay winding 428 was energized and the green lamps 46 and 49 on the first and second arches are connected across the main conductors 251 and 252 signaling the driver to drive through the wash spray which is now being delivered through the nozzles of the first arch 35. The driver now drives at a slow rate of speed through the first arch, its left wheels moving between the guide rails 26 and 27 whose rear end portions extend divergently rearwardly to facilitate the movement of the left wheels therebetween. As the vehicle moves through the spray of hot wash liquid being delivered through the nozzles 42 of the pipe 35 of the first arch, the top and vertical surfaces of the vehicle are subjected to the spray of the wash liquid from the nozzles 42 of the spray conduit 35. The velocity of the spray being relatively high, some of the dirt particles on the vehicle are mechanically moved by the spray and any adhering dirt particles are wettened and penetrated by the wash liquid. As the front portion of the vehicle moves through the first arch, the driver sees that the green lamp 49 at the second arch is lit signaling to him that he is to continue driving forwardly. As the vehicle moves forwardly of the first arch its right front wheel moves between the divergent end portions 165a and 170a of the guide rails 165 and 170 of the carriage of the wheel washing device, and, if the carriage is not properly aligned with the right front wheel, the right front wheel engages one of the guide rails and moves the carriage to proper alignment.

When the front wheels of the vehicle move onto and are supported by the idler and drive rollers 75 and 85, respectively, of the wheel washing device, the feeler bar 215 is depressed and as it moves downwardly causes the mercury switch 228 to close. Closing of the switch 228 now causes the reset solenoid 445 of the timer device 440 to be connected across the main conductors 251 and 252 through the switch 414 and the energization of the reset solenoid winding 445 causes the cam 442 to be moved to the position where it closes the switch 443. Closure of the switch 443 now causes the main timer motor 441 to be energized and the timer motor proceeds to rotate the cam 442. When the switch 443 is closed, the relay winding 460 is energized and moves its contact 419 to its open position thus causing the valve 301 of the first arch to close. Simultaneously, the closing of the switch 443 causes the valve 230 to open. As a result all of the water being pumped by the pump 260 is now supplied to the spray assemblies 122, 191, 200 and 206 of the wheel washing device. The winding 462 of the contactor 463 is also energized by the closure of the switch 443 and the motor 93 rotates the drive roller 85 which in turn rotates the front wheels of the vehicle. The hot wash liquid is now sprayed through the nozzle assemblies 122 and 200 at the outer side surfaces of the rotating front wheels to wash off or wetten any dirt adhering to these surfaces of the front wheels. Simultaneously, the spray of hot wash liquid from the nozzle assembly 191 is directed at the front surfaces of the vehicle while the spray from the nozzle assembly 206 is directed at the forward portion of the bottom surfaces of the vehicle. The relay contact 496 is also now moved to its lower position causing the green lamp 49 to be de-energized and the red lamp 48 to be lit signaling the driver to stop.

The motor 93 and the solenoid 438 of the valve 230 and the timer 441 will now remain energized for the predetermined period of time, for example, 15 seconds, predetermined by the configuration of the cam 442 and, when the cam has rotated for 15 seconds, it causes the switch 443 to open causing the valve 230 to close and stopping operation of the motor 93. The relay winding 460 is simultaneously de-energized and the solenoid valve 301 is opened since the switch 414 is still closed and the relay contact 419 moves to its closed position. The de-energization of the relay winding 490 caused by the opening of the switch 443 now causes the switch contact 496 to move back to its upper position causing the green lamp 49 to again be lit, and the red lamp 48 to be de-energized, indicating to the driver that he should proceed.

The driver now drives forwardly and the rear portions of the automobile or the vehicle are subjected to the spray of wash liquid being delivered through the nozzles 42 of the first arch as they move therethrough until the rear wheels move onto the wheel washing device 24 whereupon the closure of the mercury switch 228 and the energization of the reset solenoid 445 again causes the switch 443 to be closed, the motor 93 to be energized, the valve 230 to be opened and the valve 301 to be closed. The red lamp 48 will also be lit signaling the driver to stop. The rear wheels are now washed with the spray of wash liquid from the nozzle assemblies 122 and 200 while the rear surfaces of the automobile are sprayed with the upwardly directed spray of wash liquid from the nozzle assembly 206 and the rear bottom portions of the bottom surfaces of the automobile are subjected to the spray of water from the nozzles of the nozzle assembly 191. The rear end of the vehicle is now positioned forwardly of the first arch and of the nozzle assembly 206. This second operation of the wheel washing device now continues for another 15 seconds at which time the switch 443 again opens and if the driver has driven at the prescribed rate of speed through the first arch, the cam 412 will now rotate to the position wherein it again moves the switch 414 to its open position. As the switch 414 moves to its open position upon the termination of the initial 45 seconds of operation of the wash apparatus, the green lamp 49 again is lit and the driver is thus signaled to continue driving through the washing apparatus. At the time the switch 414 opens the switch 501 is closed by the cam 502 causing the valve 302 to open. During its travel through the second arch the vehicle is subjected to another spray of the hot wash liquid. The red lamp 50 of the third arch is now lit and indicates to the driver that he must not drive through the third arch. At the end of the second 45 seconds of operation of the wash apparatus, the cam 502 moves the switch 501 to its open position and the cam 514 simultaneously moves the switch 512 to its closed position to cause the valve 302 to close and the valve 303 to open. The green lamp 51 is simultaneously energized and indicates to the driver to proceed through the third or rinse arch 23 of the apparatus. The cam 514 holds the switch 512 closed for a predetermined period of time, in this case 30 seconds. As the vehicle is driven through the third arch, the hot water washes the wash liquid and any remaining dirt particles off the vehicle. Upon the termination of the 30 second period of operation of the third wash arch, the switch 512 is moved to its open position and, simultaneously, the switch 370 is moved to its open position by the cam 375. The valve 303 now closes when the switch 370 opens, the relay winding 356 is de-energized and the contacts 354 and 380 move to their open positions. As a result the contactor winding 390 is de-energized and, as the rate of flow of water ceases to flow through the valve 266 now decreases, the switch 355 is opened and the operation of the burner is stopped. The washing apparatus is now back in its initial condition and the above cycle of operation will be repeated when the coin switch 350 is again closed for a predetermined short period of time by a coin inserted therein.

Since the red lamp 46 is connected across the main conductors 251 and 252 through the switch 370, the red lamp 26 on the first arch will be lit after the vehicle has moved through the first rinse wash 21 to signal drivers of subsequent vehicles not to drive through the washing apparatus. Upon the termination of the full wash cycle, both the red and green lights on the three arches are de-energized and signal the driver of a subsequent vehicle not to move through the wash apparatus.

It will be apparent that at any one time only one of the valves 301, 230, 302 and 303 is open, all of the water being pumped by the pump 260 at any one time flows through only one of the spray means of the first arch, the wheel washing device, the second arch and the third arch so that a maximum rate of flow and velocity of the spray is obtained for a given capacity pump.

It will also be seen that since the vehicle during its movement between the first and second arches is stopped for the wheel washing operations, the wash liquid which has been sprayed thereon through the nozzles 42 of the nozzle pipe 35 of the spray arch has an appreciable length of time in which to penetrate and wet or dissolve dirt adhering to the outer surfaces of the automobile to facilitate its subsequent removal by the wash liquid sprayed thereon through the nozzles of the pipe 36 of the second arch or by the rinse liquid sprayed thereon through the nozzles of the pipe 37 of the third arch.

It will further be seen that the hot, rinse water sprayed on the outer surfaces of the automobile as it moves through the third rinse arch washes off any wash liquid present on such surfaces of the vehicle and also any dirt which has been further penetrated, wettened and dissolved by the wash liquid directed thereon during the passage of the vehicle through the first two spray arches.

It will further be seen that the hot wash liquid directed at the bottom surfaces of the automobile from the spray assemblies 191 and 209 washes off dirt, mud, salt and the like from the bottom surfaces of the automobile which tend to corrode the metal, this washing being especially beneficial in areas where salt has been sprinkled on streets and highways to prevent formation of ice thereon.

It will further be seen that the arches are spaced apart a distance longer than the length of the longest vehicle to be washed and that the movable carriage of the washing device 24 adjusts the position of the nozzle assembly 122 to wash the right wheels of vehicles whose right and left wheels are spaced apart different distances.

It will further be seen that wash apparatus, since it employs hot wash liquid and a hot rinse liquid, may be employed to wash automobiles even in cold climates, the high temperature of the wash liquid and of the rinse liquid facilitating the washing and rinsing of the automobile and its drying.

It will further be seen that the operation of the wash apparatus is substantially fully automatic, the driver of the vehicle merely being required to drive the vehicle in a straight line at a predetermined speed, which may be indicated by suitable signs placed at the entrance of the wash apparatus, and to stop and start the vehicle when its front and rear wheels move onto the wheel washing device and are washed thereby.

Figure 10:
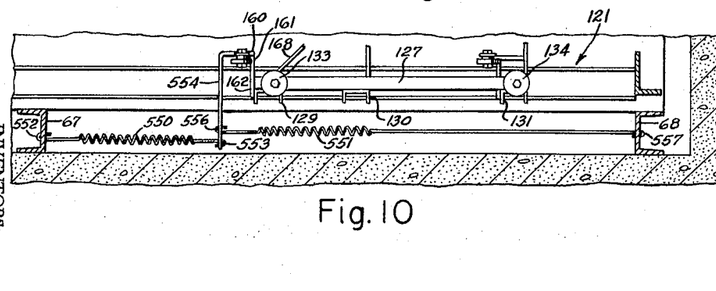
FIGURE 10 is a fragmentary sectional view, similar to FIGURE 7, showing a modified form of the wheel washing device; and, FIGURE 11 is a fragmentary perspective view showing the manner in which a guide rail of the wheel washing device may be supported by a wheel.

If desired, the carriage 121 may be biased toward an intermediate position by a pair of springs 550 and 551, FIGURE 10. The spring 550 has its hooked end 552 extending through a pair of apertures in the web of the bottom member 67 and its other hooked end 553 through similar apertures in a bar 554 which extends downwardly from the horizontal flange 160 of the bracelet 161 of the carriage. The opposite hooked ends 556 and 557 of the springs 551 are similarly secured to the bar 554 and the bottom member 68. The springs 550 and 551 ensure that the carriage will always be in position to receive the front right wheel of a vehicle between the rearwardly divergently extending portions 165a and 170a of the carriage guide rail 165 and 170 in the event that the wheel washing device is to be employed to wash the wheels of different types of vehicles whose wheel bases may vary over such a wide range that the right wheel of a wide wheel base vehicle would be disposed outwardly of the end of the guide rail portion 170a if the immediately proceeding vehicle had a very short wheel base.

Figure 11:
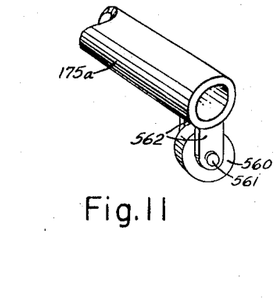

Referring now to FIGURE 11, the rear end of the guide rail portion 170a may be supported on a roller or wheel 560 rotatably mounted on the shaft 561 supported by the dependent lugs 563 welded to the guide rail portion.

It will be apparent that if desired, an additional spray arch or additional spray arches may be provided if it is desired that more than two rinse sprays be delivered to the vehicles or if it is desired that the vehicle be subjected to a spray having another agent admixed thereto, for example a waxing agent. In the latter case the waxing agent would be admixed to the hot water by means similar to that employed to introduce the detergent into the hot water by being delivered to the first spray arch. In both of these cases, of course, appropriate control means would be provided and operated by the main timer to cause the operation of such additional spray arch or spray arches to occur at a proper step in the washing cycle.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A vehicle washing apparatus including: first, second and third spray arches spaced along the path of travel of a vehicle through which the vehicle can travel, said spray arches having spray means for directing sprays of liquid downwardly and laterally inwardly at the vehicle as it moves progressively through said first, second and third arches; a wheel washing device between said first and second spray arches, said wheel washing device having support means for sequentially supporting and rotating the front and rear wheels of a vehicle, and spray means for spraying liquid at outer sides of a pair of wheels being supported and rotated by said support means; means for supplying hot water under pressure to said spray means of said arches and of said wheel washing device; means for introducing a wash agent into the hot water being supplied to said spray means of said first and second arches and of said wheel washing device; and control means for causing said means for supplying hot water to supply hot water to said spray means of said first, second and third arches sequentially for predetermined periods of time, said control means including means for stopping supply of hot water to said spray means of said first arch and for supplying water to said spray means of said wheel washing device for a predetermined period of time each time a pair of wheels moves to position to be supported and rotated by said support means of said wheel washing device.

2. A vehicle washing apparatus including: first, second and third spray arches spaced along the path of travel of a vehicle, said spray arches having spray means for directing sprays of liquid downwardly and laterally inwardly at the vehicle as it moves progressively and sequentially through said first, second and third spray arches; a wheel washing device between said first and second spray arches, said wheel washing device having support means for sequentially supporting and rotating the front and rear wheels of a vehicle, spray means for spraying a liquid on outer sides of a pair of wheels being supported and rotated by said support means, spray means for spraying the front surfaces and a forward portion of the bottom surface of a vehicle when the front wheels thereof are being supported and rotated by said support means and for spraying the rear surfaces and the rear portion of the bottom surface of the vehicle when the rear wheels of the vehicle are supported by said support means; means for supplying liquid under pressure to said spray means; means for introducing a wash agent into the liquid being supplied to said spray means of said first and second arches and of said wheel washing device; and control means for causing said means for supplying liquid to supply liquid to said spray means of said first, second and third arches sequentially for predetermined periods of time, said control means including means for stopping supply of liquid to said spray means of said first arch and for supplying water to said spray means of said wheel washing device for a predetermined period of time each time a pair of wheels of a vehicle moves to a position to be supported and rotated by said support means of said wheel washing device.

3. A vehicle washing apparatus including: first, second and third spray arches spaced along the path of travel of a vehicle, said spray arches having spray means for directing sprays of liquid downwardly and laterally inwardly at the vehicle as it moves progressively and sequentially through said first, second and third spray arches; a wheel washing device between said first and second spray arches, said wheel washing device having support means for sequentially supporting and rotating the front and rear wheels of a vehicle, and spray means for spraying a liquid on outer sides of the pair of wheels being supported and rotated by said support means; a liquid heating means; means for pumping liquid from a reservoir through said heating means; means for directing the heated liquid from said heating means to said spray means of said arches and said wheel washing device; means for introducing a wash agent into the liquid being directed from said heating means to said spray means of said first and second arches and of said wheel washing device; and control means for directing said heated liquid from said heating means sequentially to said spray means of said first, second and third arches for predetermined periods of time, said control means including means for stopping flow of liquid to said spray means of said first arch and for supplying liquid to said spray means of said wheel washing device for a predetermined period of time each time a pair of wheels of the vehicle moves to a position to be supported and rotated by said support means of said wheel washing device.

4. A vehicle washing apparatus including: first, second and third spray arches spaced along the path of travel of a vehicle, said spray arches being spaced apart from each other a distance greater than the length of a vehicle to be washed by said apparatus, said spray arches having spray means for directing sprays of liquid downwardly and laterally inwardly at the vehicle as it moves progressively and sequentially through said first, second and third spray arches; a wheel washing device between said first and second spray arches, said wheel washing device having support means for sequentially supporting and rotating the front and rear wheels of a vehicle, and spray means for spraying a liquid on outer sides of the pair of wheels being supported and rotated by said support means; a liquid heating means; means for pumping liquid from a reservoir through said heating means; means for directing the heated liquid from said heating means to said spray means of said arches and said wheel washing device; means for introducing a wash agent into the liquid being directed from said heating means to said spray means of said first and second arches and of said wheel washing device; and control means for directing said heated liquid from said heating means sequentially to said spray means of said first, second and third arches for predetermined periods of time, said control means including means for stopping flow of liquid to said spray means of said first arch and for supplying liquid to said spray means of said wheel washing device for a predetermined period of time each time a pair of wheels of the vehicle moves to a position to be supported and rotated by said support means of said wheel washing device.

5. A vehicle washing apparatus including: first, second and third spray arches spaced along the path of travel of a vehicle, said spray arches being spaced apart from each other a distance greater than the length of a vehicle to be washed by said apparatus, said spray arches having spray means for directing sprays of liquid downwardly and laterally inwardly at the vehicle as it moves progressively and sequentially through said first, second and third spray arches; a wheel washing device between said first and second spray arches, said wheel washing device having support means for sequentially supporting and rotating the front and rear wheels of a vehicle, spray means for spraying a liquid on outer sides of a pair of wheels being supported and rotated by said support means, spray means for spraying the front surfaces and a forward portion of the bottom surface of a vehicle when the front wheels thereof are being supported and rotated by said support means and for spraying the rear surfaces and the rear portion of the bottom surface of the vehicle when the rear wheels of the vehicle are supported by said support means; means for supplying liquid under pressure to said spray means; means for introducing a wash agent into the liquid being supplied to said spray means of said first and second arches and of said wheel washing device; and control means for causing said means for supplying liquid to said spray means of said first, second and third arches sequentially for predetermined periods of time, said control means including means for stopping supply of liquid to said spray means of said first arch and for supplying water to said spray means of said wheel washing device for a predetermined period of time each time a pair of wheels of a vehicle moves to a position to be supported and rotated by said support means of said wheel washing device.

6. A vehicle washing apparatus including: first, second and third spray arches spaced along the path of travel of a vehicle, said spray arches being spaced apart from each other a distance greater than the length of a vehicle to be washed by said apparatus, said spray arches having spray means for directing sprays of liquid downwardly and laterally inwardly at a vehicle as it moves progressively and sequentially through said first, second and third spray arches; a wheel washing device between said first and second spray arches, said wheel washing device having support means for sequentially supporting and rotating front and rear wheels of a vehicle and spray means for spraying liquid on outer sides of a pair of wheels being supported and rotated by said support means, said wheel washing device being spaced between said first and second spray arches to cause a vehicle when its front wheels are supported by said support means to extend through said first arch and to cause said vehicle to be disposed between said first and second arches when the rear wheels of the vehicle are supported by said support means; liquid heating means; means for pumping liquid from a reservoir through said heating means; means for directing the heated water from said heating means through said spray means of said arches and said wheel washing device; means for introducing a wash agent into the liquid being directed from said heating means to said spray means of said first and second arches and of said wheel washing device; and control means for directing said heating liquid from said heating means sequentially to said spray means of said first, second and third arches for predetermined periods of time, said control means including means for stopping flow of water to said spray means of said first arch and directing water to said spray means of said wheel washing device for a predetermined period of time each time a pair of wheels of the vehicle moves to position wherein it is supported and rotated by said support means of said wheel washing device.

7. A vehicle washing apparatus including: first, second and third spray arches spaced along the path of travel of a vehicle, said spray arches being spaced apart from each other a distance greater than the length of a vehicle to be washed by said apparatus, said spray arches having spray means for directing sprays of liquid downwardly and laterally inwardly at a vehicle as it moves progressively and sequentially through said first, second and third spray arches; a wheel washing device between said first and second spray arches, said wheel washing device having support means for sequentially supporting and rotating front and rear wheels of a vehicle and spray means for spraying liquid on outer sides of a pair of wheels being supported and rotated by said support means, said wheel washing device being spaced between said first and second spray arches to cause a vehicle when its front wheels are supported by said support means to extend through said first arch and to cause said vehicle to be disposed between said first and second arches when the rear wheels of the vehicle are supported by said support means; liquid heating means; means for pumping water from a reservoir through said heating means; conduit means for conducting heated water from said heating means to said spray means of each of said arches and said wheel washing device; valve means for controlling flow of water through said conduit means to each of said spray means; means for introducing a wash agent into water being conducted through said conduit means to said spray means of said first and second arches and of said wheel washing device; and control means for opening said valve means in predetermined sequence for predetermined periods of time to cause water to flow sequentially to said spray means of said first, second and third arches, said control means including means for closing said valve means controlling flow of water to said spray means of said first arch and opening said valve means controlling flow of water to said spray means of said wheel washing device for a predetermined period of time each time a pair of wheels of a vehicle moves to position wherein it is supported and rotated by said support means of said wheel washing device.

References Cited
UNITED STATES PATENTS

| | | | |
|---|---|---|---|
| 3,179,117 | 4/1965 | Gibson et al. | 134—107 |
| 2,807,271 | 9/1957 | Spinner | 134—45 |
| 3,024,795 | 3/1962 | Roller et al. | 134—57 X |
| 3,089,168 | 5/1963 | Blanford | 134—123 X |
| 3,134,117 | 5/1964 | Frank et al. | 134—123 X |

CHARLES A. WILLMUTH, *Primary Examiner.*

R. L. BLEUTGE, *Examiner.*